(12) United States Patent
Herber et al.

(10) Patent No.: US 11,539,451 B2
(45) Date of Patent: Dec. 27, 2022

(54) METHOD AND SYSTEM FOR MERGING CLOCKS FROM MULTIPLE PRECISION TIME PROTOCOL (PTP) CLOCK DOMAINS

(71) Applicant: NXP B.V., Eindhoven (NL)

(72) Inventors: Christian Herber, Hamburg (DE); Donald Robert Pannell, Cupertino, CA (US)

(73) Assignee: NXP B.V., Eindhoven (NL)

( * ) Notice: Subject to any disclaimer, the term of this patent is extended or adjusted under 35 U.S.C. 154(b) by 454 days.

(21) Appl. No.: 16/289,620

(22) Filed: Feb. 28, 2019

(65) Prior Publication Data

US 2020/0280383 A1    Sep. 3, 2020

(51) Int. Cl.
| | |
|---|---|
| *H04J 3/06* | (2006.01) |
| *H04W 56/00* | (2009.01) |
| *H04W 4/48* | (2018.01) |

(52) U.S. Cl.
CPC ....... *H04J 3/0638* (2013.01); *H04W 56/0015* (2013.01); *H04W 4/48* (2018.02)

(58) Field of Classification Search
CPC .... H04J 3/0638; H04W 56/0015; H04W 4/48
See application file for complete search history.

(56) References Cited

U.S. PATENT DOCUMENTS

| | | | |
|---|---|---|---|
| 8,014,378 B1 | 9/2011 | Yoon et al. | |
| 8,566,632 B2 | 10/2013 | Van de Burgt et al. | |
| 8,576,778 B2 * | 11/2013 | Irvine | H04J 3/0658 370/328 |
| 8,775,681 B2 | 7/2014 | Menon et al. | |
| 8,954,609 B1 * | 2/2015 | Holleman | H04J 3/0667 709/227 |
| 8,964,722 B2 * | 2/2015 | Le Pallec | H04J 3/0679 370/350 |
| 9,112,630 B1 * | 8/2015 | Mizrahi | H04J 3/0641 |
| 9,270,395 B2 | 2/2016 | Zheng et al. | |
| 9,690,674 B2 | 6/2017 | Cui et al. | |
| 9,912,693 B1 | 3/2018 | Balmakhtar et al. | |
| 10,348,481 B1 * | 7/2019 | Wetterwald | H04L 7/0087 |
| 2006/0140321 A1 * | 6/2006 | Tell | H04L 7/033 375/376 |
| 2010/0254225 A1 * | 10/2010 | Schweitzer, III | G04R 40/06 368/47 |

(Continued)

OTHER PUBLICATIONS

"Timing and Synchronization for Time-Sensitive Applications"; IEEE P802.1AS-Rev/D7.3, Aug. 2, 2018; 502 pgs.

(Continued)

*Primary Examiner* — Huy D Vu
*Assistant Examiner* — Bailor C Hsu (57) ABSTRACT

Embodiments of a method and device are disclosed. In an embodiment, a method for synchronizing a slave clock in a Time Sensitive Network (TSN) that includes multiple Precision Time Protocol (PTP) clock domains is disclosed. The method involves determining parameters related to multiple PTP clock domains, assigning domain-specific weights to the multiple PTP clock domains based on the determined parameters, generating a control signal for a clock parameter using the domain-specific weights assigned to the multiple PTP clock domains, and adjusting the clock parameter of a slave clock in response to the control signal.

17 Claims, 7 Drawing Sheets

(56) References Cited

U.S. PATENT DOCUMENTS

| | | | | |
|---|---|---|---|---|
| 2012/0069943 | A1* | 3/2012 | Lim | H04J 3/0641 375/371 |
| 2012/0074994 | A1* | 3/2012 | Zhong | H03L 7/0814 327/153 |
| 2012/0136956 | A1* | 5/2012 | Khoury | H04J 3/0667 709/208 |
| 2013/0013951 | A1* | 1/2013 | Gotz | G04G 7/00 713/400 |
| 2013/0279525 | A1* | 10/2013 | Zheng | H04J 3/0667 370/516 |
| 2014/0281037 | A1* | 9/2014 | Spada | H04J 3/0641 709/248 |
| 2014/0351359 | A1* | 11/2014 | Grocutt | G06F 1/12 709/209 |
| 2015/0127978 | A1* | 5/2015 | Cui | H04J 3/0641 714/15 |
| 2015/0222413 | A1* | 8/2015 | Pietilainen | H04J 3/0641 709/248 |
| 2016/0080100 | A1* | 3/2016 | Yan | H04J 3/0667 370/216 |
| 2016/0170437 | A1* | 6/2016 | Aweya | H04B 10/071 713/503 |
| 2016/0277138 | A1* | 9/2016 | Garg | H04L 41/0816 |
| 2016/0359610 | A1* | 12/2016 | Karthik | H04L 7/0008 |
| 2017/0055235 | A1* | 2/2017 | Rabii | H04N 21/43637 |
| 2017/0237512 | A1* | 8/2017 | Galea | H04J 3/0644 370/350 |
| 2017/0251508 | A1* | 8/2017 | Park | H04W 4/46 |
| 2017/0359139 | A1* | 12/2017 | Butterworth | H04L 69/08 |
| 2018/0062780 | A1* | 3/2018 | Shimizu | H04J 3/0644 |
| 2018/0227067 | A1* | 8/2018 | Hu | H04J 3/0641 |

OTHER PUBLICATIONS

Steindl, Günter; "Synchronization problems—identified topics for IEEE 802.1AS-Rev"; IEC/IEEE 60802—IA profile; Jul. 20, 2018; 23 pgs.

Cochran, Richard et al.; "Synchronizing the Linux System Time to a PTP Hardware Clock"; Conference International IEEE Symposium on Precision Clock Synchronization for Measurement Control and Communication (ISPCS), At Munich, Germany; Sep. 2011; 6 pgs.

Arias, Elisa Felicitas; "Bureau International des Poids et Mesures (BIPM)—Time Department"; https://iag.dgfi.tum.de/fileadmin/IAG-docs/Travaux2013/08_BIPM.pdf; Report of the International Association of Geodesy; 2011-2013; 9 pgs.

"Mitigation Rules and the prefer Keyword"; from Alice's Adventures in Wonderland, Lewis Carroll; retrieved from the Internet at https://www.eecis.udel.edu/~mills/ntp/html/prefer.html, Dec. 21, 2018; 5 pgs.

Takahide, M. et al. "A Master Redundancy Technique in IEEE 1588 Synchronization with a Link Congestion Estimation", IEEE International Symposium on Precision Clock Synchronization for Measurement, Control and Communication, 6 pgs. (Oct. 2010).

Cisco, "Precision Time Protocol Software Configuration Guide for Ie 2000U and Connected Grid Switches", PTP manual, Dec. 20, 2019.

Marinescu, C., "Synchronizing the Linux System time to a PTP hardware clock", Conference Paper, Sep. 2011.

* cited by examiner

METHOD AND SYSTEM FOR MERGING CLOCKS FROM MULTIPLE PRECISION TIME PROTOCOL (PTP) CLOCK DOMAINS

BACKGROUND

Modern automobiles include various electronic control units (ECUs) that implement, for example, engine control, power train control, airbag systems, antilock brake systems, cruise control, electric power steering, audio systems, window control systems, door control systems, mirror adjustment systems, and battery and recharging systems for hybrid/electric cars. The ECUs communicate with each other in an automobile via in-vehicle network (IVN) technologies such as Ethernet. Conventional IEEE standards for Ethernet switching encompassed by IEEE 802.1Q are ill suited for use cases such as audio and video streaming over Ethernet and even less suited for control-type applications based on Ethernet. The set of standards encompassed by IEEE 802.1 Audio Video Bridging (AVB) and Time Sensitive Networking (TSN) task groups extends the features of IEEE 802.1Q to satisfy the more stringent requirements for audio and video streaming. In particular, IEEE 802.1AS provides a standard (e.g., generalized Precision Time Protocol (gPTP)) for distributed synchronization needed to support synchronized packet processing. The standard specifies that a node acting as a grandmaster sends sync and follow-up messages (when in the default 2-step mode) to other nodes in order to synchronize the other nodes with the current time of the grandmaster. The initial release of gPTP was identified as IEEE 802.1AS-2011 and the release supports a single clock domain. gPTP has been enhanced (identified as IEEE 802.1AS-20xx—where xx is the year of publication which will be 2019 or 2020) to support multiple clock domains, where one use case is to use these domains for redundancy. The standard is silent on how multiple clock domains are to be processed into a single clock when multiple domains are used. The standard is also silent on how to meet functional safety requirements for any specific application (like automotive).

In conventional time sensitive networks that include more than one gPTP clock domain, a slave device uses synchronization information from only one gPTP clock domain to adjust the slave clock and switches over to a backup clock (using corresponding synchronization information) if the primary clock fails. Although it is possible to switch from one gPTP clock domain to another gPTP clock domain in response to a clock failure, the switchover can result in undesirable delay in synchronizing a slave clock to a grandmaster clock.

SUMMARY

Embodiments of a method and device are disclosed. In an embodiment, a method for synchronizing a slave clock in a Time Sensitive Network (TSN) that includes multiple Precision Time Protocol (PTP) clock domains is disclosed. The method involves determining parameters related to multiple PTP clock domains, assigning domain-specific weights to the multiple PTP clock domains based on the determined parameters, generating a control signal for a clock parameter using the domain-specific weights assigned to the multiple PTP clock domains, and adjusting the clock parameter of a slave clock in response to the control signal.

In an embodiment, the method involves generating the control signal using the domain-specific weights involves generating domain-specific control signals corresponding to the multiple PTP domains and then calculating the control signal as a weighted average of the domain-specific control signals using the domain-specific weights.

In an embodiment, the clock parameter is at least one of frequency and phase and at least one of frequency and phase of the slave clock is adjusted in response to the control signal.

In an embodiment, the parameter for each particular PTP clock domain of the multiple PTP clock domains is determined by calculating a variance of a clock parameter from information received in synchronization messages for the particular PTP clock domain.

In an embodiment, the parameter for each particular PTP clock domain of the multiple PTP clock domains is determined by detecting outlier values of a clock parameter from information received in synchronization messages and excluding the outlier values from the parameter determination, wherein an outlier value is a value of clock parameter that is outside a predefined threshold.

In an embodiment, the parameter for each particular PTP clock domain of the multiple PTP clock domains is determined based on receiving synchronization messages that indicate a loss of synchronization.

In an embodiment, a value of the parameter corresponding to a particular PTP clock domain that indicates a loss of synchronization is adjusted and wherein the adjusted value of the parameter translates to an adjusted domain-specific weight for the particular PTP domain.

In an embodiment, the parameter for each particular PTP clock domain of the multiple PTP clock domains is determined based on failure to receive synchronization messages from a particular PTP clock domain.

In an embodiment, a value of the parameter corresponding to the particular PTP clock domain is reduced and wherein the reduced value of the parameter translates to a reduced weight for the PTP clock domain.

In an embodiment, information from a PTP clock domain is excluded from the weighted average calculation when a link that supports the PTP clock domain is unavailable.

A device for use in a Time Sensitive Network (TSN) is disclosed. The device includes a parameter determination module configured to determine parameters related to multiple Precision Time Protocol (PTP) clock domains, a weight assignment module configured to assign domain-specific weights to the multiple PTP clock domains based on the determined parameters, and a weighted merge module configured to generate a control signal for a clock parameter using the domain-specific weights assigned to the multiple PTP clock domains, and a slave clock that is adjusted in response to the control signal.

In an embodiment, the device further includes a clock synchronization control module configured to generate domain-specific control signals corresponding to the multiple PTP domains and wherein the weighted merge module is configured to calculate the control signal as a weighted average of the domain-specific control signals using the domain-specific weights.

In an embodiment of the device, the clock parameter is at least one of frequency and phase and at least one of frequency and phase of the slave clock is adjusted in response to the control signal.

In an embodiment of the device, the parameter for each particular PTP clock domain of the multiple PTP clock domains is determined by calculating a variance of a clock parameter from information received in synchronization messages for the particular PTP clock domain.

In an embodiment of the device, the parameter for each particular PTP clock domain of the multiple PTP clock domains is determined by detecting outlier values of a clock parameter from information received in synchronization messages and excluding the outlier values from the parameter determination, wherein an outlier value is a value of clock parameter that is outside a predefined threshold.

In an embodiment of the device, the parameter for each particular PTP clock domain of the multiple PTP clock domains is determined based on receiving messages that indicate a loss of synchronization.

In an embodiment of the device, a value of the parameter corresponding to a particular PTP clock domain that indicates a loss of synchronization is adjusted and the adjusted value of the parameter translates to an adjusted weight for the particular PTP domain.

In an embodiment of the device, the parameter for each particular PTP clock domain of the multiple PTP clock domains is determined based on failure to receive synchronization messages from a particular PTP clock domain.

In an embodiment of the device, a value of the parameter corresponding to the particular PTP clock domain is adjusted and the adjusted value of the parameter translates to an adjusted weight for the PTP clock domain.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Time-sensitive networking (TSN) is a set of standards in the IEEE 802.1 Working Group that was formed by renaming the Audio Video Bridging (AVB) Task Group. A key benefit of AVB/TSN is the synchronization of networked devices, which is enabled by gPTP—the generalized Precision Time Protocol. The gPTP standard (also known as IEEE 802.1AS) was developed by the AVB Task Group and released by the IEEE in 2011 and utilizes Ethernet frames to distribute time synchronization information. AVB/TSN utilizes distributed timing in which gPTP nodes periodically exchange Ethernet frames that included embedded timing information to synchronize the gPTP nodes to a gPTP grandmaster. The TSN Task Group has enhanced gPTP (also known as IEEE 802.1AS-<<year of publication, either 2019 or 2020>>) to support multiple clock domains to support, at least but not limited to, clock redundancy.

Figure 1:
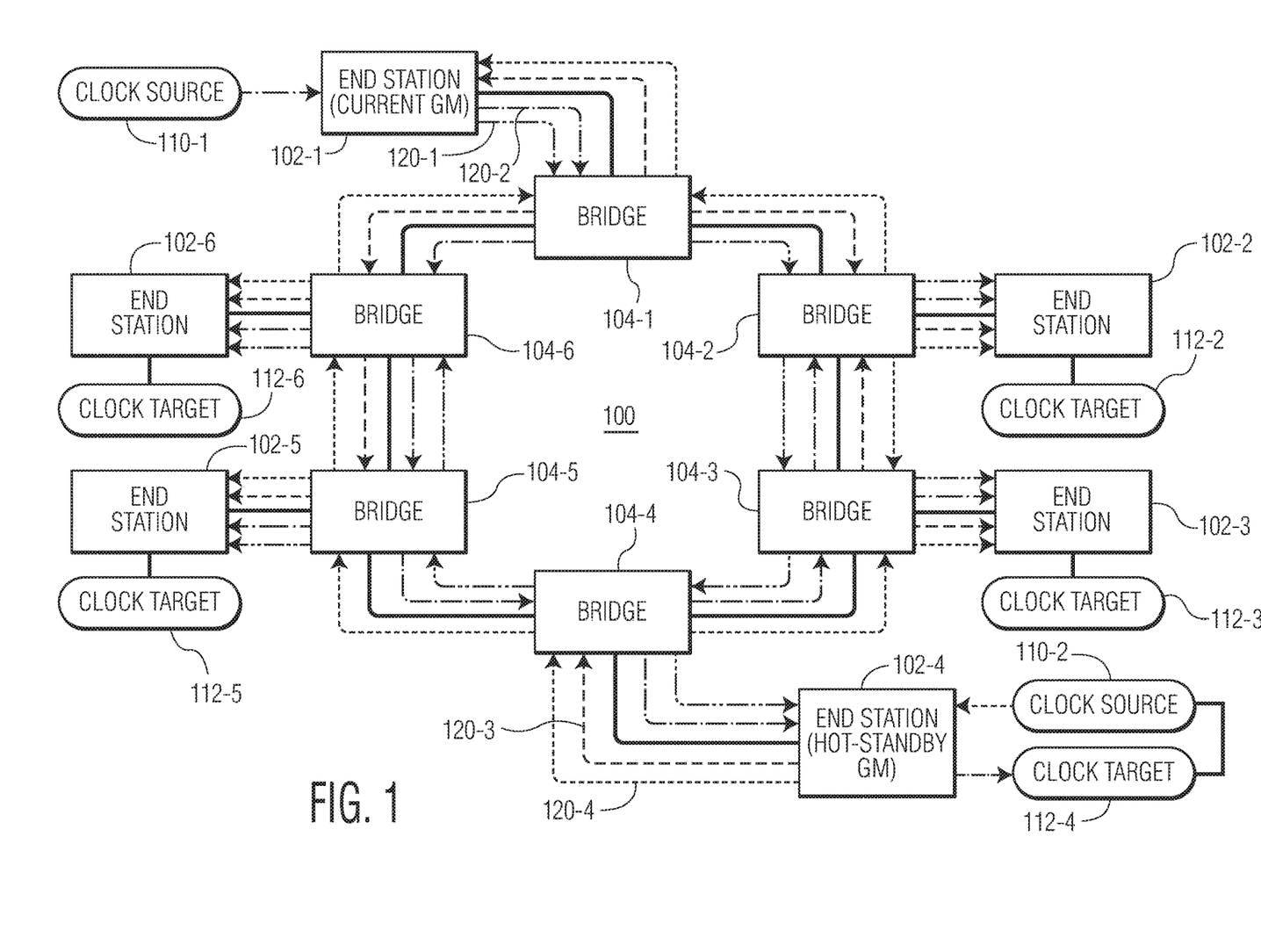
FIG. 1 depicts a network, such as an in-vehicle network (IVN) that is configured to use, for example, IEEE 802.1AS (e.g., gPTP), to enable distributed clock synchronization.

FIG. 1 depicts a network 100, such as an in-vehicle network (IVN) that is configured to use, for example, IEEE 802.1AS (e.g., gPTP), to enable distributed clock synchronization. The network includes various nodes that include end stations 102-1-102-6 and bridges 104-1-104-6. The end stations may include, for example, various electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. FIG. 1 also includes two clock sources (clock source 110-1 and clock source 110-2) and various clock targets 112-1-112-6 that are associated with the end stations. In the example of FIG. 1, the end station 102-1 that corresponds to clock source 110-1 is currently designated as the "grandmaster" or "GM" and the end station 102-4 that corresponds to clock source 110-2 is designated as the "hot-standby grandmaster" or "hot-standby GM." In the example network, each clock source is used to establish two gPTP clock domains that are distributed throughout the network (taking separate paths for the best possible redundancy). As shown in FIG. 1, gPTP clock domain 120-1 and gPTP clock domain 120-2 are generated at the current grandmaster (end station 102-1) and gPTP clock domain 120-3 and gPTP clock domain 120-4 are generated at the hot-standby grandmaster (end station 102-4). Although the clock sources are each used to establish two gPTP clock domains, the clocks could be used to generate one clock domain or more than two clock domains and the network may include only one clock source or more than two clock sources.

Although the network 100 of FIG. 1 is described as using IEEE 802.1AS and gPTP clock domains, the network could implement other Precision Time Protocols to support Time Sensitive Networking. The term "PTP" is used herein to refer to a Precision Time Protocol that may include, for example, the generalized Precision Time Protocol (gPTP). Although the network is shown as a ring or loop network, the network can have other configurations such as hub and spoke and although the network includes bridges, the network may include other types of nodes, such as, for example, routers, switches, and/or multi-port end stations. Additionally, in other configurations, the grandmaster can be coupled to multiple time-aware bridges and multiple end nodes can be coupled to each time-aware bridge.

Figure 2:
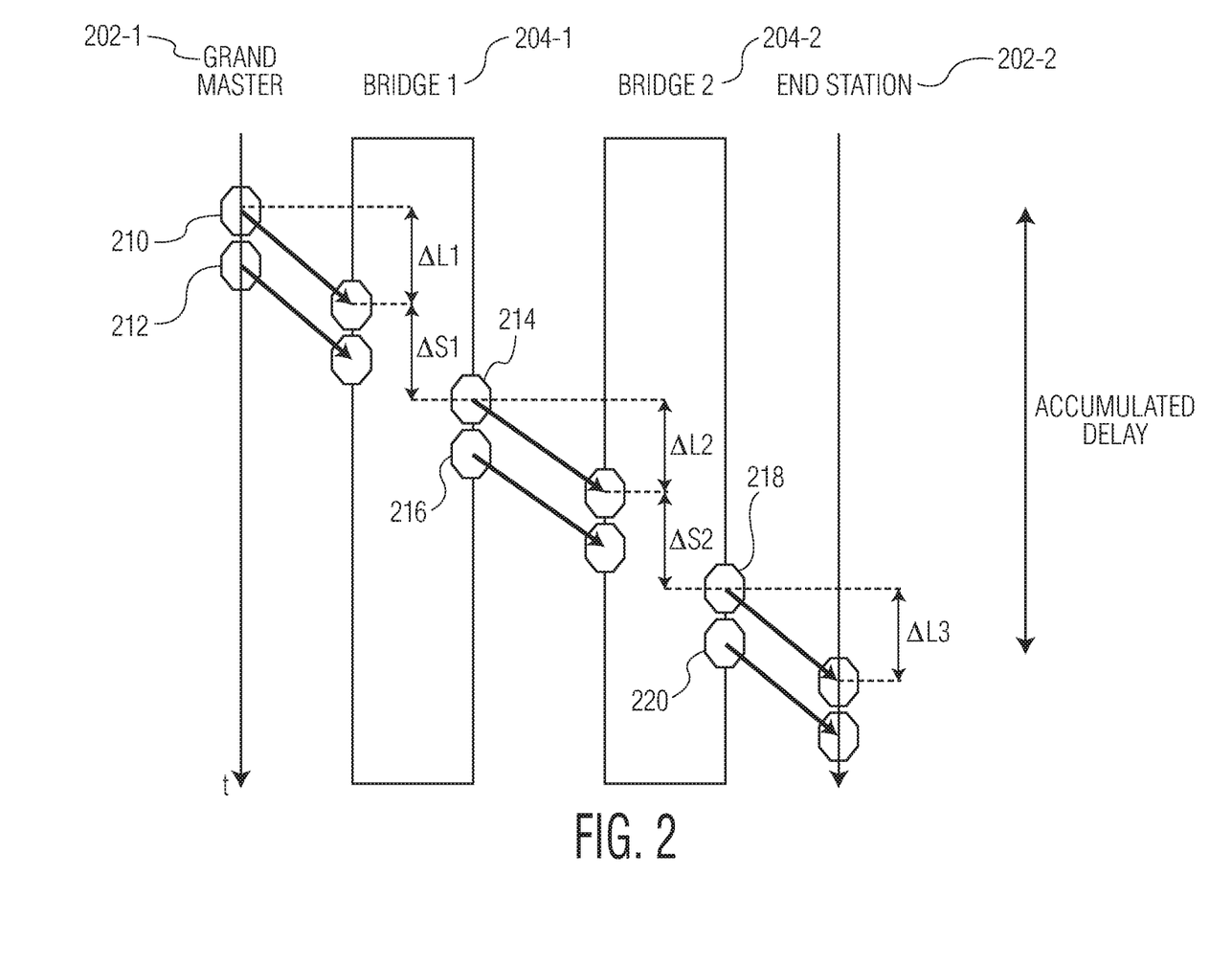
FIG. 2 illustrates the transmission of sync and follow-up messages from a grandmaster to bridges and to an end station in the network of FIG. 1.

In order to maintain synchronization of the end stations with the grandmaster, a synchronization operation is performed. The synchronization operation is performed, in part, by the grandmaster periodically transmitting synchronization (or "sync") messages and follow-up messages (e.g., via Ethernet frames) and, in part, by bridges or end stations computing a local clock time based on information from the follow-up messages and a locally computed network propagation delay. A sync message can be carried in a minimum-sized Ethernet frame configured to carry frame type information (e.g., that the frame is a sync frame) without much additional information in order to enable quick transmission across a network. FIG. 2 illustrates the transmission of sync and follow-up messages from a grandmaster 202-1 to bridges 204-1 and 204-2 and to an end station 202-2 in the network. At time 210, a sync message can be sent from the grandmaster to bridge 1 and, at time 212 a follow-up message carrying an initial clock time can subsequently be sent. Bridge 1 can then compute a local clock time by adding the propagation delay between the grandmaster and bridge 1 to the clock time. Bridge 1 can then forward the sync message to bridge 2 at time 214 and compute a clock time to transmit in a follow-up message at time 216 to bridge 2. The process can be repeated to send a sync message to the end station at time 218 and a follow-up message to the end station at time 220. The clock time to transmit in a follow-up message can be the source GM clock time plus the correction for accumulated network propagation delay and accumulated residence time. The network propagation delay can be computed from a follow-up message based on the propagation delay of a message between two nodes (e.g., between the grandmaster and bridge 1), residence time of a message within a node (e.g., within bridge 1), and a rate ratio between bridges or end stations in the network with respect to the grandmaster (e.g., a rate ratio between bridge 1 204-1 and end station 202-2).

In order to determine propagation delay, nodes can periodically exchange timing-related messages and perform internal calculations based on the timing-related messages. For example, messages specified by the IEEE 802.1AS protocol include in an "Announce" message, a "Sync" message, a "Follow_Up" message, a "Pdelay_Req" message, and "Pdelay_Resp" and "Pdelay_Resp_Follow_Up" messages. The messages may include synchronization information that includes:

Precise Origin TS—Sec (TS_timestamp, Sec—seconds);
Precise Origin TS—Ns (Ns—nanoseconds);
TLV—GM time base;
TLV—Last GM phase change;
TLV—Scaled GM phase change;
Request receipt TS—Sec; and
Request receipt TS—Ns.

Figure 3:
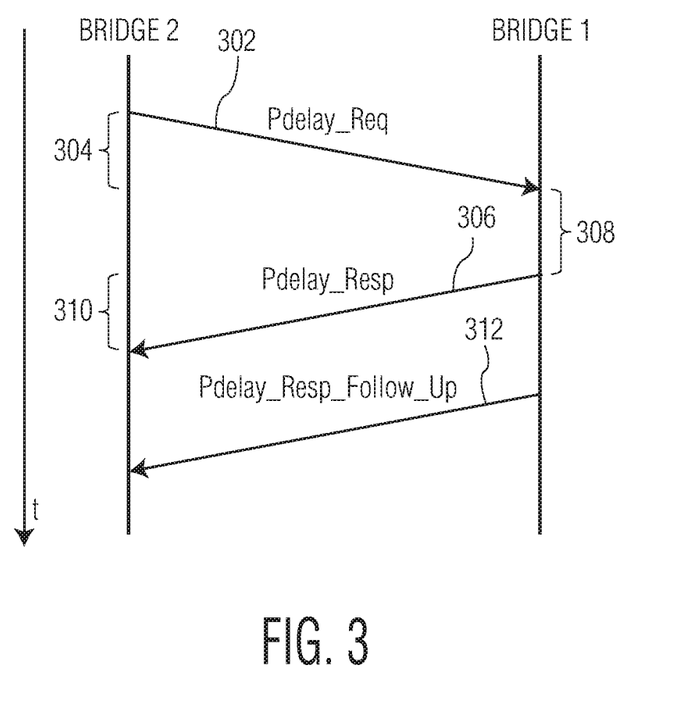
FIG. 3 illustrates the exchange of messages to determine the propagation delay between bridge 1 and bridge 2 of FIG. 2.

In an embodiment, messages exchanged to determine propagation delay can be exchanged independent of a synchronization operation or during a synchronization operation. In an embodiment where the physical topology of a network does not change over time, propagation delay of the cables can be defined as a constant value. FIG. 3 illustrates the exchange of messages to determine the propagation delay of the cable between bridge 1 and bridge 2 of FIG. 2. The exchange can begin by a first bridge (e.g., "bridge 2") transmitting a first time-stamped message ("Pdelay_Req) 302 to a second bridge or end station (e.g., "bridge 1"). Bridge 1 can then transmit a time-stamped message ("Pdelay_Resp") 306 back to bridge 2 along with the amount of time between receiving the message from bridge 2 and sending the Pdelay_Resp message back (e.g., "residence time") 308. Bridge 2 can then calculate the propagation delay 304, 310 associated with packets received from bridge 1 by using the timing information. Bridge 1 can then transmit a Pdelay_Resp_Follow_Up message 312 to bridge 2 to update bridge 2 on the propagation delay associated with packets received from bridge 2 by bridge 1.

The neighbor rate ratio (NRR) and the rate ratio for bridges or nodes in the network can be determined at fixed intervals using the following equations:

$$\text{Neighbor Rate Ratio (for Switch 1)} = \frac{[\text{time when } PD \text{ follow-up message is sent}] - [\text{time when } PD \text{ response is sent}]}{[\text{time when } PD \text{ follow-up is received}] - [\text{time when } PD \text{ response is received}]}$$

$$\text{Rate Ratio} = [\text{Current Rate Ratio}] + (NRR - 1)$$

where "PD follow-up" is the same as "Pdelay_Resp_Follow_Up" and "PD response" is the same as "Pdelay_Resp".

The rate ratio can be used as an indication of the frequency offset (e.g., as a percentage difference between the frequencies of two clocks) between the clocks of the two bridges. Synchronization information can also be used to determine phase offset (e.g., as a difference in absolute time in, for example, nanoseconds (ns), between two clocks). Offsets (e.g., frequency and phase) can be used to synchronize a slave clock to a grandmaster clock. In some embodiments, the calculations and forwarding described with respect to FIGS. 2 and 3 are performed via software executed by a microcontroller at an end station. In other embodiments, some of the above-identified operations may be implemented in a PHY device.

Figure 4:
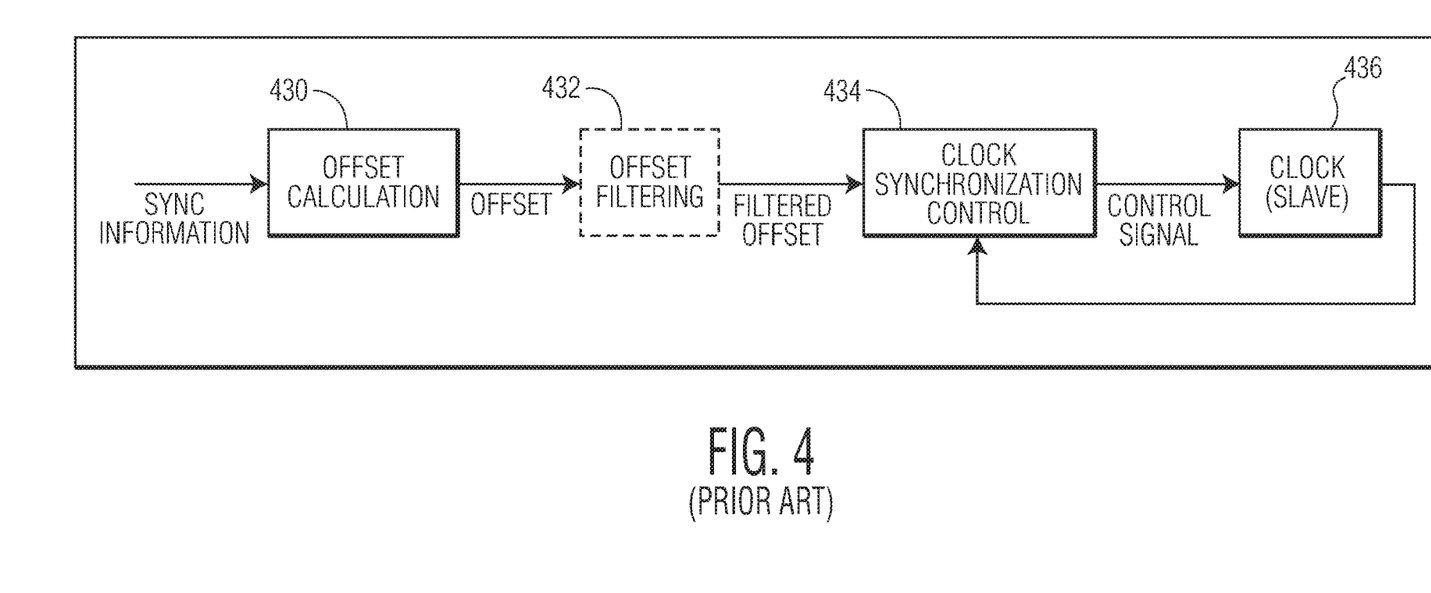
FIG. 4 depicts a functional block diagram that illustrates a conventional system and process for synchronizing a slave clock in a time sensitive network that includes a single PTP clock domain.

At each end station that is designated as a slave device with regard to clock information, synchronization information that is distributed throughout the network (e.g., as specified by IEEE 801.2AS), is used to adjust the clock at the slave device (sometimes referred to as the "slave clock") so that the slave clock is synchronized with the clock of the grandmaster (the process of clock synchronization is also sometime referred to as "clock recover"). For example, the nodes within the network exchange messages and perform timing related calculations as described above with regard to FIGS. 2 and 3. FIG. 4 depicts a functional block diagram that illustrates an example of a conventional system and process for synchronizing a slave clock in a time sensitive network that includes a single PTP clock domain. The process depicted in FIG. 4 involves an offset calculation 430, offset filtering 432, and clock synchronization control 434. In the example illustrated in FIG. 4, the offset calculation involves determining a frequency offset from synchronization information that is carried in messages as specified by the IEEE 802.1AS protocol. Techniques for calculating offset such as frequency offset of the responder (responding device) relative to the requester (requesting device), are known in the field and may involve operations similar to those described above with regard to FIGS. 2 and 3.

Offset is typically calculated in terms of frequency offset and phase offset. Offset (e.g., frequency offset and/or phase offset) is then subjected to offset filtering. For example, the offset filtering may involve calculating a moving average of the offset, calculating a moving median of the offset, calculating an exponential average of the offset, and/or detecting outlier values of the offset and excluding the outlier values from further consideration, for example, in the average/median calculations. The filtering operation may not be used in every application and is thus optional as indicated by the dashed line box. The offset (either filtered or unfiltered) is then used in a clock synchronization control process to adjust a slave clock 436, e.g., to adjust the frequency and/or phase of the clock at the slave device. As illustrated in FIG. 4, the clock synchronization control process outputs a control signal and receives feedback from the slave clock, for example, the feedback includes the frequency and/or phase of the slave clock. In an example, the clock synchronization control process may involve proportional integral (PI) control or linear regression control. PI control and linear regression control are known in the field. The clock synchronization control process outputs a control signal to the slave clock that causes the frequency and/or phase of the slave clock to be adjusted. For example, the control signal may be a digital signal provided to a slave clock register to increase or decrease the clock rate (e.g., to increase or decrease the clock frequency or "tick rate" of the slave clock) or to increase or decrease a clock value (e.g., increase or decrease the absolute clock value of the slave clock by number of nanoseconds). In an embodiment, the control signal is a digital value that adjusts (e.g., increases or decreases) the frequency of the slave clock by, for example, setting a register (e.g., a "RATE" register of the slave clock), to compensate for the frequency offset. In an embodiment, the control signal is a digital value that adjusts (e.g., increases or decreases) the phase of the slave clock by, for example, setting a register (e.g., a "CLKVAL" register of the slave clock), to compensate for the phase offset. In an embodiment, the control signal may have a frequency component (e.g., to set the RATE register) and a phase component (e.g., to set the CLKVAL register) to adjust the frequency and the phase of the slave clock.

As described above, FIG. 4 illustrates a process for adjusting a slave clock based on synchronization information from a single PTP clock domain. However, as depicted in FIG. 1, time sensitive networks that implement a Precision Time Protocol (e.g., IEEE 802.1AS (gPTP)) may include more than one PTP clock domain that is distributed throughout the network. In conventional time sensitive networks that include more than one PTP clock domain, a slave device uses synchronization information from only one PTP clock domain to adjust the slave clock and switches over to a backup clock (using corresponding synchronization information) if the primary clock fails. Although it is possible to switch from one PTP clock domain to another PTP clock domain in response to a clock failure, the switchover can result in undesirable delay in synchronizing a slave clock to a grandmaster clock.

In accordance with an embodiment of the invention, a method for synchronizing a slave clock in a time sensitive network (TSN) that includes multiple PTP clock domains involves assigning domain-specific weights to the multiple PTP clock domains based on some parameter related to the multiple PTP clock domains, using the domain-specific weights to generate a control signal for a clock parameter (such as frequency or phase), and adjusting the clock parameter of a slave clock in response to the control signal. In an embodiment, the domain-specific weights are assigned to the PTP clock domains based on a parameter that reflects the current quality of clock information related to the particular PTP clock domain. For example, the domain-specific weight of a PTP clock domain may be assigned based on a variance measurement, outlier detection, loss of sync holdover detection, and/or sync timeout. In an embodiment, the control signal for the slave clock is calculated as a weighted average of domain-specific control signals using the assigned domain-specific weights. Because the control signal for the slave clock is generated using the domain-specific weights (e.g., by calculating a weighted average of domain-specific control signals), clock information from PTP clock domains that are deemed to be of higher quality can have more influence on the control of the slave clock (e.g., more influence on adjustments that are made to the frequency and or phase of the slave clock) to synchronize the slave clock with the grandmaster clock. Thus, in an embodiment, the process involves a weighted average merge of clock information from multiple PTP time clock domains using domain-specific weights where the domain-specific weights are determined at the slave device based on, for example, the quality of the clock information which may be based on, for example, offset information determined from received synchronization messages (e.g., variance of information and/or outlier information) and/or based on information related to the health of the PTP clock domain and/or the health of a device or link that corresponds to the PTP clock domain.

Figure 5:
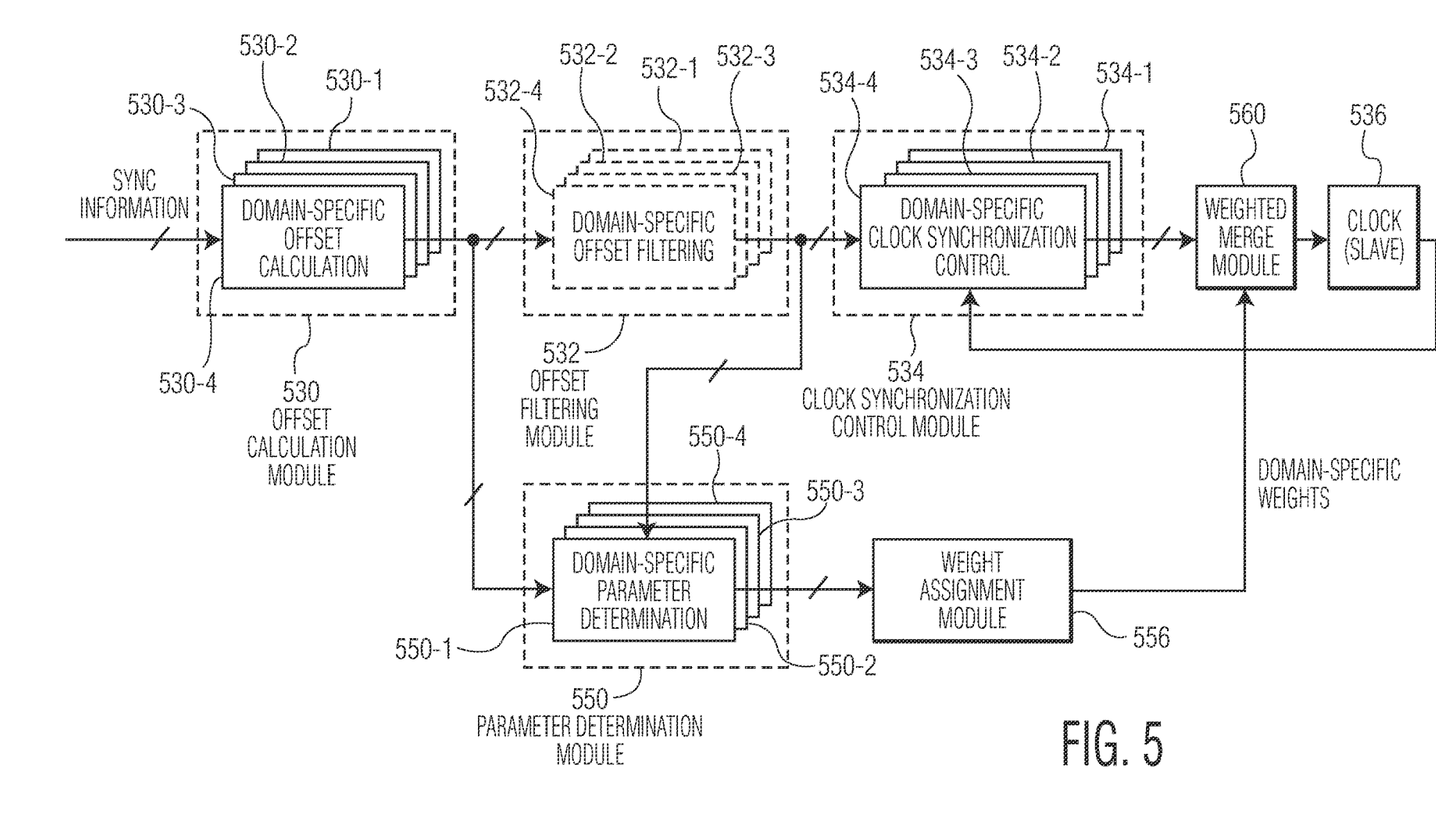
FIG. 5 depicts a functional block diagram that illustrates a system and process for synchronizing a slave clock in a time sensitive network that includes multiple PTP clock domains that utilizes a weighted merge according to an embodiment of the invention.

FIG. 5 depicts a functional block diagram that illustrates a system and process for synchronizing a slave clock in a time sensitive network that includes multiple PTP clock domains (e.g., gPTP clock domains). The system depicted in FIG. 5 includes an offset calculation module 530, an offset filtering module 532, a clock synchronization control module 534, and a clock 536 (e.g., a slave clock) similar to the functional block diagram of FIG. 4, as well as a parameter determination module 550, a weight assignment module 556, and a weighted merge module 560. In the example of FIG. 5, there are four different PTP clock domains similar to FIG. 1, although more or less than four different PTP clock domains are possible.

The offset calculation module 530 is configured to implement domain-specific offset calculations for each of the four PTP clock domains. Techniques for calculating offset such as frequency offset of the responder (responding device) relative to the requester (requesting device), are known in the field and may involve operations similar to those described above with regard to FIGS. 2 and 3. In an embodiment, the offset calculation module includes a domain-specific offset calculation element 530-1-530-4 (e.g. a hardware circuit) for each PTP clock domain to implement domain-specific offset calculations. In other embodiments, the offset calculation module is implemented in software or firmware in, for example, a microcontroller.

The offset filtering module 532 is configured to implement domain-specific offset filtering for each of the four PTP clock domains. For example, the offset filtering may involve calculating a moving average of the offset, calculating a moving medium of the offset, calculating an exponential average of the offset, and/or detecting outlier values of the offset for each clock domain and excluding the outlier values from further consideration, for example, in the average/median calculations. The filtering operations may not be used in every application and are thus optional as indicated by the dashed line box. In an embodiment, the offset filtering module includes a domain-specific offset filtering element 532-1-532-4 (e.g. a hardware circuit) for each PTP clock domain to implement domain-specific offset filtering. In other embodiments, the offset filtering module is implemented in software or firmware in, for example, a microcontroller. The offset (either filtered or unfiltered) is then provided to the clock synchronization control module.

The clock synchronization control module 534 is configured to implement domain-specific clock synchronization control for each of the four PTP clock domains. The clock synchronization control module outputs four domain-specific control signals to the weighted merge module and receives feedback from the slave clock, for example, the feedback includes the frequency and/or phase of the slave clock. In an example, the clock synchronization control module may be configured to implement proportional integral (PI) control or linear regression control. PI control and linear regression control are known in the field. In an embodiment, the clock synchronization control module includes a domain-specific clock synchronization control element 534-1-534-4 (e.g. a hardware circuit) for each PTP clock domain to implement domain-specific clock synchronization control. In other embodiments, the clock synchronization control module is implemented in software or firmware in, for example, a microcontroller.

Parameter Determination Module/Weight Assignment Module

The parameter determination module 550 is configured to determine parameters related to the four PTP clock domains and the weight assignment module is configured to assign domain-specific weights to the four PTP clock domains based on the determine parameters. In an embodiment, the parameter determination module includes a domain-specific parameter determination element 550-1-550-4 (e.g. a hardware circuit) for each PTP clock domain to implement domain-specific parameter determination. In other embodiments, the parameter determination module is implemented in software or firmware in, for example, a microcontroller. Examples of parameter determination and corresponding weight assignments are described below for various parameters including parameters related to offset variance, outlier values, loss-of-sync holdover detection, sync timeout, and link availability.

Offset Variance

In an embodiment, the parameter determination module 550 determines a parameter related to variance in, for example, the frequency offset or the phase offset that is calculated by the offset calculation module. For example, the parameter determination module may receive offset information from the offset calculation module and/or from the offset filtering module and can use the information to calculate a variance. For example, a variance can be calculated from a moving average, from a moving medium, or from an exponential average by taking an average of the squares minus the average squared. PTP clock domains that exhibit higher variance can be given a lower quality rating as the determined parameter and the lower quality rating can be translated to a lower domain-specific weight by the weight assignment module 556. In another embodiment, domain-specific weights can be derived (e.g., mathematically calculated) directly from the variances. Although variance is provided as an example of a statistical evaluation applied to the offset data, other statistical evaluations may be applied to the offset data to determine a parameter related to the multiple PTP clock domains.

Outlier Detection

In an embodiment, the offset values generated from the offset calculations and/or from the offset filtering are evaluated for "outlier" values. For example, outlier values are values that fall outside of some predefined threshold, e.g., either above a predefined threshold or below a predefined threshold. In an embodiment, outlier values of the offset are excluded from consideration in the parameter determination and are thus excluded from consideration in the weight assignment process. Identifying and excluding outlier values can help to provide better weighting, e.g., weights that reflect the current offset values.

Loss-of-Sync Holdover Detection

In some embodiments, a bridge that is implementing a PTP protocol such as gPTP may keep sending sync messages with an incremented correction time even though the bridge has detected a loss of sync. For example, the condition may occur in bridges implementing the Avnu Automotive profile of gPTP. In an embodiment, the parameter determination module 550 is configured to detect sync messages with incremented corrections times and to output a parameter that is reflective of the condition. For example, detection may involve identifying that the origin time of two subsequent "Sync" or "Follow_Up" messages is identical but the correction time is advanced. In an embodiment, a parameter that is reflective of the condition is assigned a relatively lower weight by the weight assignment module 556 so that the corresponding PTP clock domain has less influence on the slave clock adjustment.

Sync Timeout

In some cases, a node may stop receiving clock information (e.g., in the form of "Sync" messages and/or "Announce" messages) related to a particular PTP clock domain. This condition may be recognized as a "sync timeout" condition. In an embodiment, the parameter determination module 550 is configured to detect that the node has stopped receiving clock information (e.g., in the form of sync messages) and to output a parameter that is reflective of the sync timeout condition. In an embodiment, a parameter that is reflective of the sync timeout condition is assigned a relatively lower weight by the weight assignment module 556 so that the corresponding PTP clock domain has less influence on the slave clock adjustment. The weight of the PTP clock domain can be increased once sync messages start to be received again. In an embodiment, a clock domain assigned by the weight assignment module that experiences a sync timeout may be excluded from the weighted merge operation, e.g., by setting the domain-specific weight to zero.

Link Availability

In some cases, a link to a node may be down or malfunctioning. In an embodiment, the parameter determination module 550 is configured to detect that a link is down or malfunctioning and to generate a parameter that is reflective of the link condition. In an embodiment, a parameter that is reflective of an undesirable link condition is assigned a relatively lower weight by the weight assignment module 556 so that the corresponding PTP clock domain has less influence on the slave clock adjustment. The weight of the PTP clock domain can be increased once the link condition improves. In an embodiment, a clock domain that experiences a link failure may be excluded from the weighted merge operation, e.g., by setting the domain-specific weight to zero.

Weight Assignment in General

As described above, the parameter determination module 550 monitors current conditions of the PTP clock domains (e.g., four gPTP clock domains) and generates parameters (e.g., expressed as ratings or conditions) ratings that correspond to the current conditions of the clock domains. For example, the parameter may represent/correspond to the quality of the clock information, e.g., variance or outliers, and/or the parameter may represent/correspond to the health of the PTP clock domain, e.g., loss of sync, sync timeout, link availability. The domain-specific parameters can be translated by the weight assignment module 556 to domain-specific weights that correspond to the particular parameter for the particular clock domain. Although some examples of parameters are described, other parameters can be determined by the parameter determination module. For example, other parameters that provide an indication of the quality of the offset information and/or parameters that provide an indication of the health of a node and/or link may be determined. In an embodiment as described above, relatively higher weights are assigned to more desirable conditions and relatively lower weights are assigned to less desirable conditions. However, other weighing schemes are possible.

In an embodiment, values associated with monitored parameters of the clock domains are assumed to be normally distributed and the values associated with the monitored parameters are assumed to be independent between domains. In an embodiment, weights are assigned to maximize the quality of the recovered clock (e.g., to minimize the frequency and/or phase offset to the relative to the grandmaster).

Weighted Merge Module

The weighted merge module 560 is configured to generate a control signal from the domain-specific control signals that are generated by the clock synchronization control module 534 and from the domain-specific weights that are provided by the weight assignment module 556. In an embodiment, the weighted merge module is configured to calculate the control signal as a weighted average of the domain-specific control signals using the domain-specific weights that are provided from the weight assignment module. Although in one embodiment, the weighted merge module calculates a weighted average of the domain-specific control signals, in other embodiments, the domain-specific control signals and the domain-specific weights may be merged using a different function. In an embodiment, the weighted merge module is implemented in a hardware circuit and in other embodiments, the weighted merge module is implemented in software or firmware in, for example, a microcontroller.

The control signal generated by the weighted merge module 560 is provided to the slave clock 536 to cause the frequency and/or phase of the slave clock to be adjusted. For example, the control signal may be a digital signal provided to a slave clock register to increase or decrease the clock frequency (e.g., the "tick rate") and/or the control signal may be a signal to increase or decrease the clock value (e.g., add/subtract nanoseconds to/from the clock value).

ISO-26262 Safety Mechanism

Figure 6:
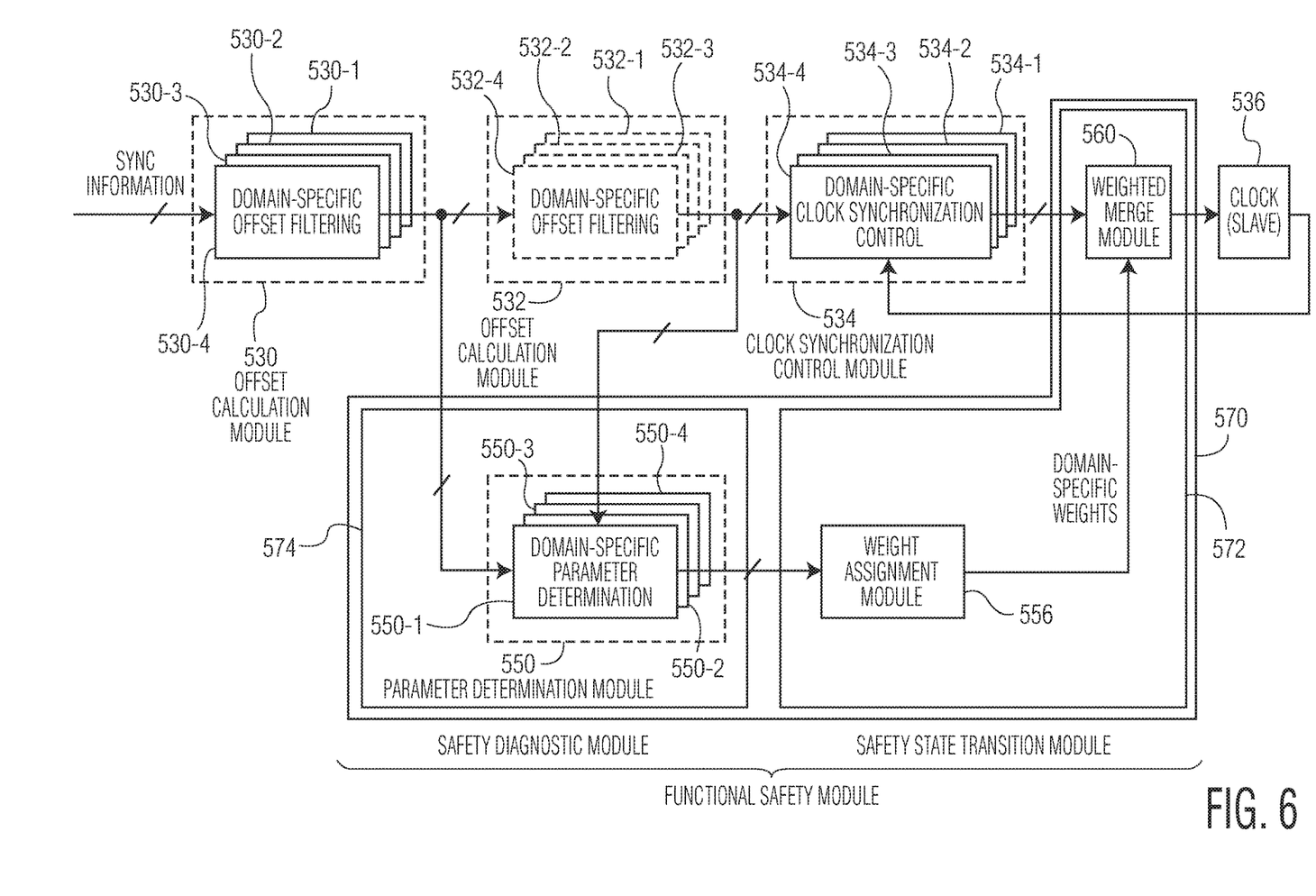
FIG. 6 depicts a functional block diagram that illustrates a system and process for synchronizing a slave clock in a time sensitive network that includes multiple PTP clock domains that can also be used to support implementation of a functional safety standard in accordance with an embodiment of the invention.

In 2011, the International Organization for Standardization (ISO) defined ISO 26262, entitled "Road vehicles—Functional safety." ISO 26262 is a standard for functional safety of electrical and/or electronic systems in production automobiles. In an embodiment, the above-described system and processes can be used to implement at least a portion of the standard. FIG. 6 depicts a functional block diagram that illustrates a system and process for synchronizing a slave clock in a time sensitive network that includes multiple PTP clock domains that can also be used to support implementation of a functional safety standard such as the ISO 26262 standard. The system depicted in FIG. 6 includes elements similar to FIG. 5 in which some elements are also used to implement a functional safety module 570, e.g., a module that is able to support implementation of the ISO 26262 standard. As illustrated in FIG. 6, the parameter determination module 550 can be used to implement a safety diagnostic module 574 that is configured to identify functional safety issues and the weight calculation module and the weighted merge module 556 can be used to implement a safety state transition module 572 that identifies transitions between different states (e.g., operational or fail-safe state, where the fail-safe state can be fail-operational) for elements of a time sensitive network. For example, the functional safety module 570 may identify a safety condition that relates to the quality of the clock information, e.g., variance or outliers, and/or the functional safety module 570 may identify a safety condition that relates to the health of a PTP clock domain, e.g., loss of sync, sync timeout, link availability. In an embodiment, the functional safety module is configured to output a safety related signal or signals (e.g., a state signal such as a failure state or an operational state), that can be used to implement the ISO 26262 standard.

Figure 7:
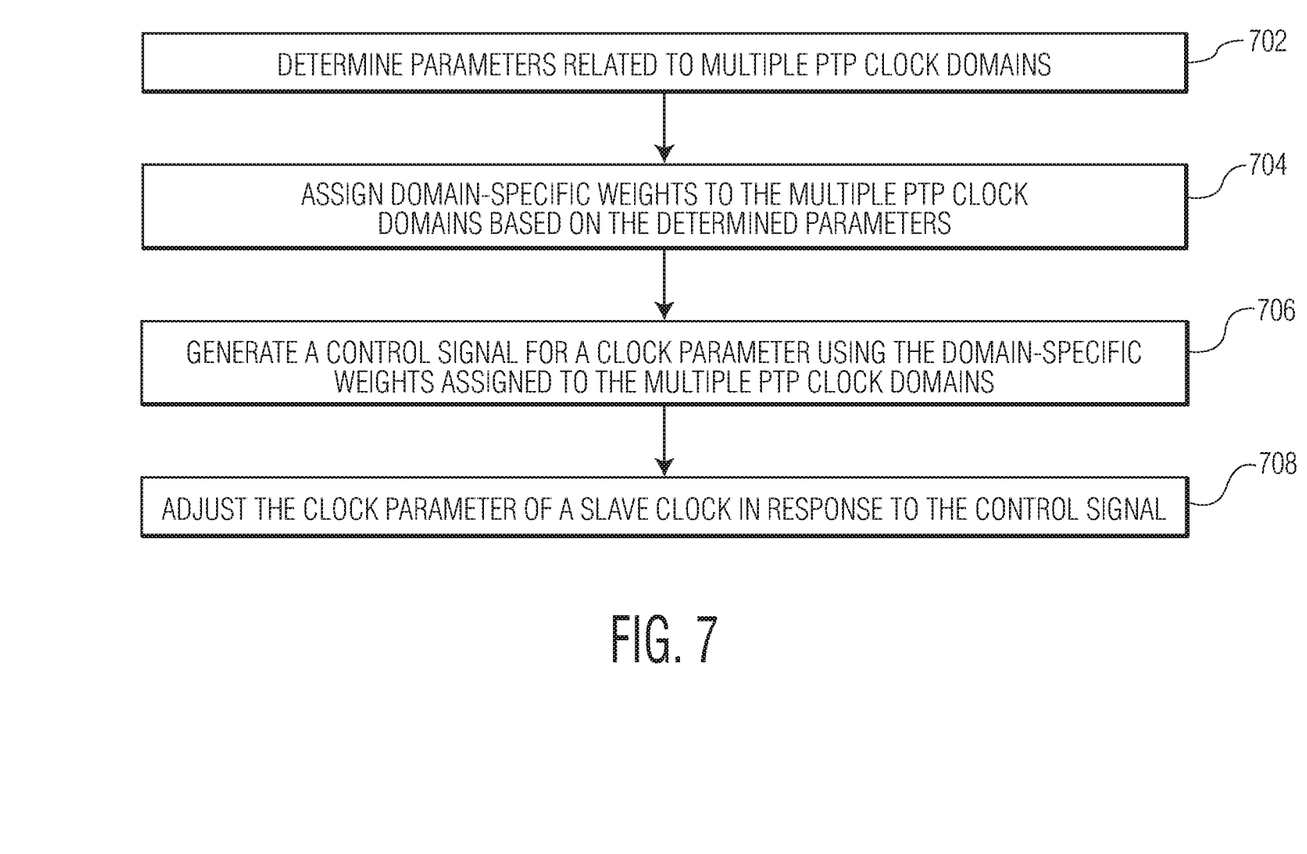
FIG. 7 is a process flow diagram of a method for synchronizing a slave clock in a Time Sensitive Network (TSN) that includes multiple Precision Time Protocol (PTP) clock domains in accordance with an embodiment of the invention.

FIG. 7 is a process flow diagram of a method for synchronizing a slave clock in a Time Sensitive Network (TSN) that includes multiple Precision Time Protocol (PTP) clock domains. According to the method, at block 702, parameters related to multiple PTP clock domains are determined. At block 704, domain-specific weights are assigned to the multiple PTP clock domains based on the determined parameters. At block 706, a control signal is generated for a clock parameter using the domain-specific weights assigned to the multiple PTP clock domains. At block 708, the clock parameter of a slave clock is adjusted in response to the control signal.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for synchronizing a slave clock in a Time Sensitive Network (TSN) that includes multiple Precision Time Protocol (PTP) clock domains, the method comprising:
   determining parameters related to multiple PTP clock domains;
   assigning domain-specific weights to the multiple PTP clock domains based on the determined parameters;
   generating a control signal for a clock parameter using the domain-specific weights assigned to the multiple PTP clock domains; and
   adjusting the clock parameter of the slave clock in response to the control signal;
   wherein generating the control signal using the domain-specific weights involves generating domain-specific control signals corresponding to the multiple PTP domains and then calculating the control signal as a weighted average of the domain-specific control signals using the domain-specific weights, wherein the control signal comprises a digital value that adjusts a phase or a frequency of the slave clock by setting a register of the slave clock, and wherein the parameter for each particular PTP clock domain of the multiple PTP clock domains is determined to represent quality of information received in synchronization messages for the particular PTP clock domain or health of the particular PTP clock domain.

2. The method of claim 1 wherein the clock parameter is at least one of frequency and phase and at least one of frequency and phase of the slave clock is adjusted in response to the control signal.

3. The method of claim 1, wherein the parameter for each particular PTP clock domain of the multiple PTP clock domains is determined by calculating a variance of a clock parameter from information received in synchronization messages for the particular PTP clock domain.

4. The method of claim 1, wherein the parameter for each particular PTP clock domain of the multiple PTP clock domains is determined by detecting outlier values of a clock parameter from information received in synchronization messages and excluding the outlier values from the parameter determination, wherein an outlier value is a value of clock parameter that is outside a predefined threshold.

5. The method of claim 1, wherein the parameter for each particular PTP clock domain of the multiple PTP clock domains is determined based on receiving synchronization messages that indicate a loss of synchronization.

6. The method of claim 5, wherein a value of the parameter corresponding to a particular PTP clock domain that indicates a loss of synchronization is adjusted and wherein the adjusted value of the parameter translates to an adjusted domain-specific weight for the particular PTP domain.

7. The method of claim 1, wherein the parameter for each particular PTP clock domain of the multiple PTP clock domains is determined based on failure to receive synchronization messages from a particular PTP clock domain.

8. The method of claim 7, wherein a value of the parameter corresponding to the particular PTP clock domain is reduced and wherein the reduced value of the parameter translates to a reduced weight for the PTP clock domain.

9. The method of claim 1, wherein information from a PTP clock domain is excluded from the weighted average calculation when a link that supports the PTP clock domain is unavailable.

10. A device for use in a Time Sensitive Network (TSN), the device comprising:
    a parameter determination module configured to determine parameters related to multiple Precision Time Protocol (PTP) clock domains;
    a weight assignment module configured to assign domain-specific weights to the multiple PTP clock domains based on the determined parameters;
    a weighted merge module configured to generate a control signal for a clock parameter using the domain-specific weights assigned to the multiple PTP clock domains;
    a slave clock that is adjusted in response to the control signal; and
    a clock synchronization control module configured to generate domain-specific control signals corresponding to the multiple PTP domains and wherein the weighted merge module is configured to calculate the control signal as a weighted average of the domain-specific control signals using the domain-specific weights, wherein the control signal comprises a digital value that adjusts a phase or a frequency of the slave clock by setting a register of the slave clock, and wherein the parameter for each particular PTP clock domain of the multiple PTP clock domains is determined to represent quality of information received in synchronization messages for the particular PTP clock domain or health of the particular PTP clock domain.

11. The device of claim 10 wherein the clock parameter is at least one of frequency and phase and at least one of frequency and phase of the slave clock is adjusted in response to the control signal.

12. The device of claim 10, wherein the parameter for each particular PTP clock domain of the multiple PTP clock domains is determined by calculating a variance of a clock parameter from information received in synchronization messages for the particular PTP clock domain.

13. The device of claim 10, wherein the parameter for each particular PTP clock domain of the multiple PTP clock domains is determined by detecting outlier values of a clock parameter from information received in synchronization messages and excluding the outlier values from the parameter determination, wherein an outlier value is a value of clock parameter that is outside a predefined threshold.

14. The device of claim 10, wherein the parameter for each particular PTP clock domain of the multiple PTP clock domains is determined based on receiving messages that indicate a loss of synchronization.

15. The device of claim 14, wherein a value of the parameter corresponding to a particular PTP clock domain that indicates a loss of synchronization is adjusted and the adjusted value of the parameter translates to an adjusted weight for the particular PTP domain.

16. The device of claim 10, wherein the parameter for each particular PTP clock domain of the multiple PTP clock domains is determined based on failure to receive synchronization messages from a particular PTP clock domain.

17. The device of claim 10, wherein a value of the parameter corresponding to the particular PTP clock domain is adjusted and the adjusted value of the parameter translates to an adjusted weight for the PTP clock domain.

\* \* \* \* \*